US007995526B2

United States Patent
Liu et al.

(10) Patent No.: US 7,995,526 B2
(45) Date of Patent: Aug. 9, 2011

(54) APPARATUS AND METHOD FOR MEDIUM ACCESS CONTROL IN WIRELESS COMMUNICATION NETWORKS

(75) Inventors: Haiyang Liu, Blaine, MN (US); Ramakrishna Budampati, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 731 days.

(21) Appl. No.: 12/107,928

(22) Filed: Apr. 23, 2008

(65) Prior Publication Data
US 2009/0268674 A1 Oct. 29, 2009

(51) Int. Cl.
*H04W 72/00* (2009.01)
*H04W 16/14* (2009.01)
(52) U.S. Cl. ........................................ 370/329; 370/462
(58) Field of Classification Search .................... None
See application file for complete search history.

(56) References Cited

U.S. PATENT DOCUMENTS

| | | | | |
|---|---|---|---|---|
| 7,627,326 | B1 * | 12/2009 | Miller, II | 455/454 |
| 2007/0104140 | A1 * | 5/2007 | Ashish et al. | 370/329 |
| 2008/0112360 | A1 * | 5/2008 | Seidel et al. | 370/329 |
| 2008/0293353 | A1 * | 11/2008 | Mody et al. | 455/1 |
| 2008/0317062 | A1 * | 12/2008 | Timmers et al. | 370/462 |
| 2009/0180492 | A1 * | 7/2009 | Hu | 370/462 |
| 2009/0219909 | A1 * | 9/2009 | Ko et al. | 370/343 |
| 2009/0268783 | A1 * | 10/2009 | Karabinis | 375/130 |
| 2010/0061256 | A1 * | 3/2010 | Ang et al. | 370/252 |
| 2010/0220693 | A1 * | 9/2010 | Ho | 370/336 |
| 2011/0032892 | A1 * | 2/2011 | Bahl et al. | 370/329 |

OTHER PUBLICATIONS

Haiyang Liu et al., "Apparatus and Method for Routing Data in Wireless Networks"; U.S. Appl. No. 12/120,005, filed May 13, 2008.
Haiyang Liu et al., "PWave: A Multi-source Multi-sink Anycast Routing Framework for Wireless Sensor Networks", Proceedings of the 6th International IFIP-TC6 Networking Conference, Networking 2007, May 2007, 12 pages.
Sanjit Biswas et al., "ExOR: Opportunistic Multi-Hop Routing for Wireless Networks", SIGCOMM '05, Aug. 21-26, 2005, 11 pages.
Szymon Chachulski et al., "Trading Structure for Randomness in Wireless Opportunistic Routing", SIGCOMM '07, Aug. 27-31, 2007, 12 pages.
Douglas S.J. De Couto et al., "A High-Throughput Patch Metric for Multi-Hop Wireless Routing", MobiCom '03, Sep. 14-19, 2003, 13 pages.
Rudolf Ahlswede et al., "Network Information Flow", IEEE Transactions on Information Theory, vol. 46, No. 4, Jul. 2000, pp. 1204-1216.
Shuo-Yen Robert Li et al., "Linear Network Coding", IEEE Transactions Informatioin Theory, vol. 49, No. 2, Feb. 2003, pp. 371-381.
Desmond S. Lun et al., "Efficient Operation of Wireless Packet Networks Using Network Coding", International Workshop on Convergent Technologies (IWCT), 2005, pp. 1-5.

(Continued)

*Primary Examiner* — Min Jung
(74) *Attorney, Agent, or Firm* — Munck Carter, LLP

(57) ABSTRACT

A method includes identifying a white space at a first wireless node and selecting a channel in the identified white space. The white space includes at least one frequency or frequency band not in use (like a licensed frequency or frequency band). The method also includes identifying at the first wireless node a channel access factor for each of multiple wireless nodes including the first wireless node. The method further includes determining if the first wireless node has a specified channel access factor. In addition, the method includes transmitting data from the first wireless node on the channel when the first wireless node has the specified channel access factor. The channel access factors can be identified and the determination whether the first wireless node has the specified channel access factor can be performed without using control signals transmitted between the wireless nodes. The channel access factor could represent a hash function value.

20 Claims, 3 Drawing Sheets

OTHER PUBLICATIONS

Alec Woo et al. "Taming the Underlying Challenges of Reliable Multihop Routing in Sensor Networks", SenSys '03, Nov. 5-7, 2003, 14 pages.

Gang Lu et al., "Delay Efficient Sleep Scheduling in Wireless Sensor Networks", 2005 IEEE, pp. 2470-2481.

Peter G. Doyle et al., "Random walks and electric networks", Jul. 5, 2006, pp. 1-118.

Haifeng Qian et al., "Power Grid Analysis Using Random Walks", IEEE Transactions on Computer-Aided Design of Integrated Circuits and Systems, vol. 24, No. 8, Aug. 2005, pp. 1204-1224.

"Relaxation Methods for Boundary Value Problems", Partial Differential Equations, pp. 854-862.

Chalermek Intanagonwiwat et al., "Directed Diffusion: A Scalable and Robust Communication Paradigm for Sensor Networks", 12 pages.

Philip Levis et al., "TOSSIM: Accurate and Scalable Simulation of Entire TinyOS Applications", 12 pages.

Mark LaPedus, "Intel Harnesses Wireless Sensors for Chip-Equipment Care", techweb network, Oct. 29, 2003, 2 pages.

Fan Ye et al., "A Scalable Solution to Minimum Cost Forwarding in Large Sensor Networks", 6 pages.

* cited by examiner

APPARATUS AND METHOD FOR MEDIUM ACCESS CONTROL IN WIRELESS COMMUNICATION NETWORKS

TECHNICAL FIELD

This disclosure relates generally to wireless communication networks. More specifically, this disclosure relates to an apparatus and method for medium access control in wireless communication networks.

BACKGROUND

Radio frequencies often represent very valuable (and sometime scarce) resources. Radio frequencies can often be divided into two general categories, namely licensed and unlicensed. Licensed frequency bands represent frequencies whose use is often tightly controlled, while unlicensed frequency bands are available for use by many entities with little or no regulation. Unlicensed frequency bands include the so-called "Industrial, Scientific, and Medical" (ISM) bands.

In recent years, the unlicensed frequency bands have become quite crowded. This is due to many factors, including the proliferation of wireless devices in the ISM bands, the explosive growth of 802.11 popularity, and expected city-wide WiFi and other mesh networks. On the other hand, many licensed spectrums are extremely underutilized. Some measurements have shown that only five percent of the licensed spectrum from 30 MHz to 30 GHz is actively used in the United States.

Because of this, recent interest has been shown in permitting the use of unlicensed devices in the licensed frequency bands. One approach is to allow unlicensed devices to operate using licensed frequencies or frequency bands as long as licensed users (called "primary" users) are not operating on the licensed frequencies or frequency bands. The spectrums or portions thereof that are not in active use by primary users are called "white spaces."

Cognitive radios are one emerging and quite promising technique to facilitate the use of white spaces. Cognitive radios are designed to change their transmission and reception parameters to avoid interference with other devices. The use of cognitive radios often requires an efficient Medium Access Control (MAC) scheme to take advantage of potentially dynamic white spaces. However, conventional MAC schemes are typically deterministic and therefore require precise coordination (control signal exchanges) among users. In addition to large overheads, these types of schemes are often highly fragile and unreliable in real-world operations.

SUMMARY

This disclosure provides an apparatus and method for medium access control in wireless communication networks.

In a first embodiment, a method includes identifying a white space at a first wireless node and selecting a channel in the identified white space. The white space includes at least one frequency or frequency band not in use. The method also includes identifying at the first wireless node a channel access factor for each of multiple wireless nodes including the first wireless node. The method further includes determining if the first wireless node has a specified channel access factor. In addition, the method includes transmitting data from the first wireless node on the channel when the first wireless node has the specified channel access factor.

In particular embodiments, identifying the channel access factor for each of the multiple wireless nodes and determining if the first wireless node has the specified channel access factor are performed without using control signals transmitted between the wireless nodes.

In other particular embodiments, the channel includes a frequency slot and a time slot. Also, the channel access factor includes a hash function value determined using a hash function. The hash function is based on a wireless node identifier, the frequency slot, and/or the time slot. The hash function could also be based on a wireless node weight. The specified channel access factor could include a highest hash function value.

In yet other particular embodiments, the method also includes notifying one or more receiving wireless nodes that the first wireless node will transmit the data on the channel.

In still other particular embodiments, the method also includes transmitting information associated with the identified white space to at least one other wireless node. The method further includes receiving information associated with at least one additional identified white space from the at least one other wireless node. The information associated with the identified white space could be transmitted to one-hop and two-hop neighbors of the first wireless node. Each one-hop neighbor includes a wireless node directly communicating with the first wireless node, and each two-hop neighbor includes a wireless node directly communicating with a one-hop neighbor.

In additional particular embodiments, the at least one frequency or frequency band not in use includes at least one licensed frequency or frequency band.

In a second embodiment, an apparatus includes a spectrum sensing unit configured to identify a white space, where the white space includes at least one frequency or frequency band not in use. The apparatus also includes a channel selection unit configured to identify a channel access factor for each of multiple wireless nodes (where the wireless nodes include the apparatus). The channel selection unit is also configured to determine if the apparatus has a specified channel access factor. In addition, the apparatus includes a control unit configured to control transmission of data from the apparatus on the channel depending on whether the apparatus has the specified channel access factor.

In a third embodiment, a computer program is embodied on a computer readable medium. The computer program includes computer readable program code for identifying a white space at a first wireless node and computer readable program code for selecting a channel in the identified white space. The white space includes at least one frequency or frequency band not in use. The computer program also includes computer readable program code for identifying at the first wireless node a channel access factor for each of multiple wireless nodes including the first wireless node. The computer program further includes computer readable program code for determining if the first wireless node has a specified channel access factor. In addition, the computer program includes computer readable program code for initiating transmission of data from the first wireless node on the channel when the first wireless node has the specified channel access factor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
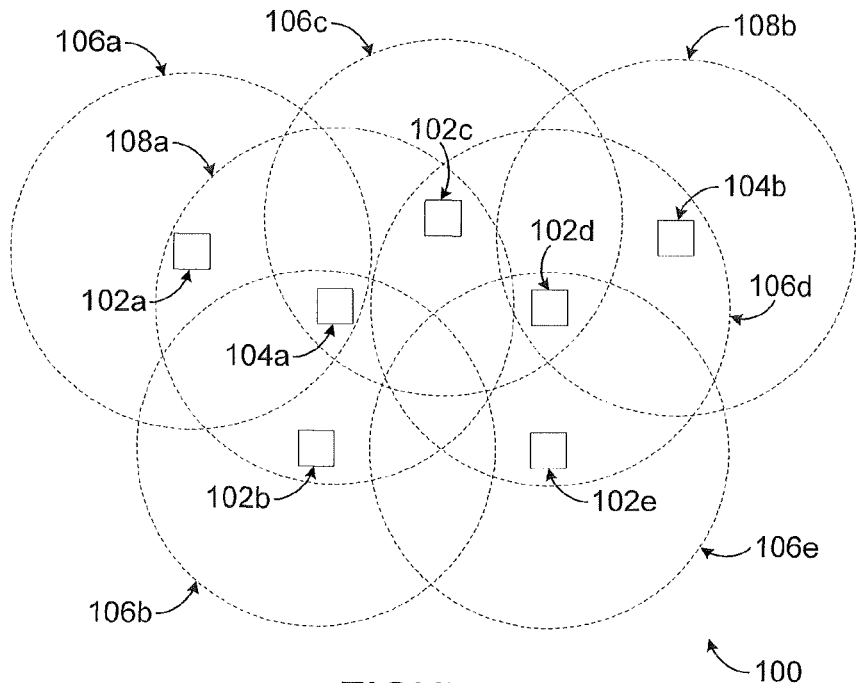
FIG. 1 illustrates an example wireless communication network in accordance with this disclosure.

FIG. 1 illustrates an example wireless communication network 100 in accordance with this disclosure. The embodiment of the wireless communication network 100 shown in FIG. 1 is for illustration only. Other embodiments of the wireless communication network 100 could be used without departing from the scope of this disclosure.

As shown in FIG. 1, the wireless communication network 100 includes multiple wireless nodes 102a-102e and 104a-104b. The wireless nodes 102a-102e and 104a-104b generally represent devices or systems that transmit and/or receive data wirelessly. For example, the wireless nodes 102a-102e and 104a-104b could represent wireless access points (WAPs), wireless routers, base stations, or other devices or systems that communicate wirelessly. Each of the wireless nodes 102a-102e and 104a-104b includes any suitable structure(s) for communicating wirelessly. As a particular example, at least some of the wireless nodes 102a-102e and 104a-104b could represent cognitive radios, such as Software Defined Radios (SDRs) (like those implemented using the ETTUS SDR platform).

The wireless nodes 102a-102e and 104a-104b could transmit and receive any suitable wireless signals. For example, the wireless nodes 102a-102e and 104a-104b could use radio frequency (RF) signals to communicate. Each of the wireless nodes 102a-102e and 104a-104b also typically communicates over one or more channels. The channels could represent frequency-time slots, where a wireless node communicates in a particular time slot using a particular frequency.

Wireless communications by the wireless nodes 102a-102e create interference regions 106a-106e around the wireless nodes 102a-102e. Similarly, wireless communications by the wireless nodes 104a-104b create interference regions 108a-108b around the wireless nodes 104a-104b. Each of the interference regions 106a-106e and 108a-108b represents an area where one wireless node's communications can interfere with the communications of other wireless nodes. Although shown as being circular in FIG. 1, each of the interference regions 106a-106e and 108a-108b could have any other shape (such as a shape based on the placement of the wireless node and the environment around the wireless node). In FIG. 1, each of the wireless nodes 102a-102e and 104a-104b is located in the interference region of at least one other wireless node. It may be noted, however, that one or more of the wireless nodes could be located outside all other wireless nodes' interference regions.

In some embodiments, the wireless nodes 102a-102e and 104a-104b represent different licensed and unlicensed devices or systems (with respect to the frequencies or frequency bands used for communications). For example, the wireless nodes 104a-104b could be licensed to use one or more licensed frequencies or frequency bands, while the wireless nodes 102a-102e may not be licensed to use the one or more licensed frequencies or frequency bands. In this case, the wireless nodes 104a-104b represent "primary users," meaning they have priority to use the licensed frequencies or frequency bands. The wireless nodes 102a-102e represent "secondary users," meaning they are required to avoid interfering with the primary users' use of the licensed frequencies or frequency bands.

The wireless nodes 102a-102e therefore engage in various operations to identify one or more channels that can be used for wireless communications. For example, the wireless nodes 102a-102e can identify white spaces that are not in active use by any primary users. The wireless nodes 102a-102e can then select and use channels (such as frequency-time slots) in the identified white spaces. This allows the wireless nodes 102a-102e to select channels that do not interfere with the communications involving the wireless nodes 104a-104b.

Conventional systems often require a large number of control signals to be exchanged between wireless nodes so the wireless nodes can select channels for communications. This can lead to large overheads, reductions in network throughput, unreliable network behaviors, or other problems. As described in more detail below, once the white spaces are identified, the wireless nodes 102a-102e implement a function (such as a hash function) that allows the wireless nodes 102a-102e to identify which nodes can use channels in the white spaces. Moreover, the wireless nodes 102a-102e can implement this function in a way that reduces the need for control signals to be exchanged between the wireless nodes 102a-102e. This can reduce overhead, increase throughput, and increase reliability in the wireless communication network 100.

Although FIG. 1 illustrates one example of a wireless communication network 100, various changes may be made to FIG. 1. For example, the wireless communication network 100 could include any number of licensed and unlicensed wireless nodes. Also, the licensed and unlicensed wireless nodes could have any suitable configuration. In addition, the interference regions of the wireless nodes could have any suitable sizes and shapes.

Figure 2:
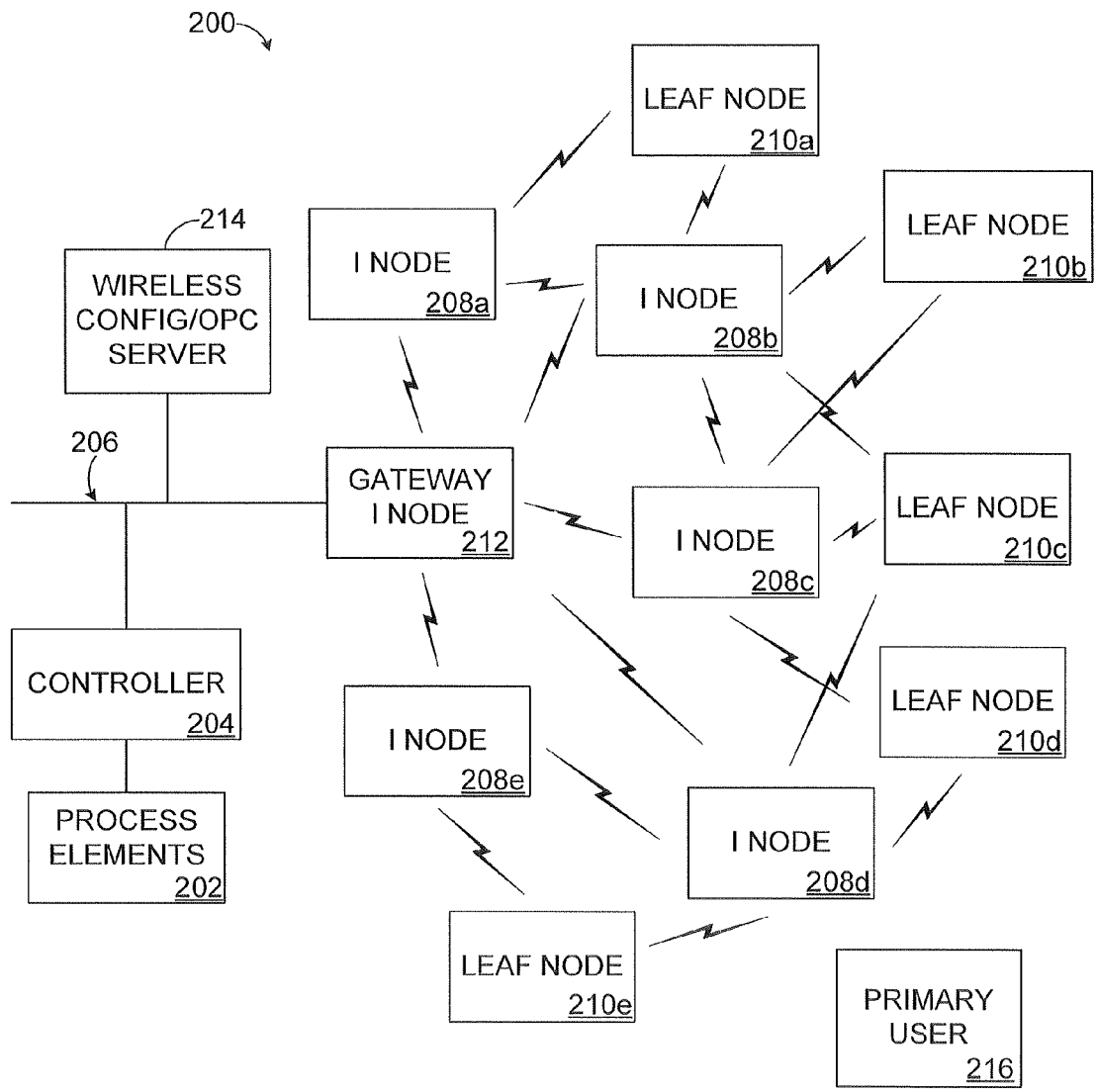
FIG. 2 illustrates an example process control system in accordance with this disclosure.

FIG. 2 illustrates an example process control system 200 in accordance with this disclosure. In particular, FIG. 2 illustrates a process control system 200 having unlicensed wireless nodes that can operate using licensed frequencies or frequency bands. The embodiment of the process control system 200 shown in FIG. 2 is for illustration only. Other embodiments of the process control system 200 could be used without departing from the scope of this disclosure.

As shown in FIG. 2, the process control system 200 includes one or more process elements 202. The process elements 202 represent components in a process system that may perform any of a wide variety of functions. For example, the process elements 202 could represent sensors, actuators, or any other or additional industrial equipment in a processing environment. Each of the process elements 202 includes any suitable structure for performing one or more functions in a process system. Also, a "process system" may generally represent any system or portion thereof configured to process one or more products or other materials in some manner.

A controller 204 is coupled to the process elements 202. The controller 204 controls the operation of one or more of the process elements 202. For example, the controller 204 could receive information associated with the process system, such as by receiving sensor measurements from some of the process elements 202. The controller 204 could use this information to provide control signals to others of the process elements 202, thereby adjusting the operation of those process elements 202. The controller 204 includes any hardware, software, firmware, or combination thereof for controlling one or more process elements 202. The controller 204 could, for example, represent a computing device executing a MICROSOFT WINDOWS operating system.

A network 206 facilitates communication between various components in the system 200. For example, the network 206 may communicate Internet Protocol (IP) packets, frame relay frames, Asynchronous Transfer Mode (ATM) cells, or other suitable information between network addresses. The network 206 may include one or more local area networks (LANs), metropolitan area networks (MANs), wide area networks (WANs), all or a portion of a global network such as the Internet, or any other communication system or systems at one or more locations.

As shown in FIG. 2, the process control system 200 also includes one or more wireless networks for communicating with wireless sensors or other wireless devices. In this example, a wireless network (such as a mesh network) is formed using infrastructure nodes ("I nodes") 208a-208e, leaf nodes 210a-210e, and a gateway infrastructure node 212.

The infrastructure nodes 208a-208e and the leaf nodes 210a-210e engage in wireless communications with each other. For example, the infrastructure nodes 208a-208e may receive data transmitted over the network 206 (via the gateway infrastructure node 212) and wirelessly communicate the data to the leaf nodes 210a-210e. Similarly, the leaf nodes 210a-210e may wirelessly communicate data to the infrastructure nodes 208a-208e for forwarding to the network 206 (via the gateway infrastructure node 212). In addition, the infrastructure nodes 208a-208e may wirelessly exchange data with one another. In this way, the nodes 208a-208e and 210a-210e form a wireless network capable of providing wireless coverage to a specified area, such as in a large industrial complex.

In this example, the nodes 208a-208e and 210a-210e are divided into infrastructure nodes and leaf nodes. The infrastructure nodes 208a-208e typically represent line-powered devices, meaning these nodes receive operating power from an external source. As a result, these nodes 208a-208e are typically not limited in their operations since they need not minimize power consumption to increase the operational life of their internal power supplies. On the other hand, the leaf nodes 210a-210e typically represent devices powered by local power supplies, such as nodes that receive operating power from internal batteries or other internal power supplies. Because of this, these nodes 210a-210e are often more limited in their operations in order to help preserve the operational life of their internal power supplies. These nodes 210a-210e also routinely need to have their internal batteries or other internal power supplies replaced in order to remain in operation.

Each of the nodes 208a-208e and 210a-210e includes any suitable structure facilitating wireless communications, such as an RF transceiver. Each of the nodes 208a-208e and 210a-210e could also include other functionality, such as functionality for generating or using data communicated over the wireless network. For example, the leaf nodes 210a-210e could represent wireless sensors in an industrial facility, where the sensors are used to measure various characteristics within the facility. These sensors could collect sensor readings and communicate the sensor readings to the controller 204 via the gateway infrastructure node 212. The leaf nodes 210a-210e could also represent actuators that can receive control signals from the controller 204 and adjust the operation of the industrial facility. In this way, the leaf nodes 210a-210e may include or operate in a similar manner as the process elements 202 that are physically connected to the controller 204. The leaf nodes 210a-210e could further represent handheld user devices (such as INTELATRAC devices from HONEYWELL INTERNATIONAL INC.), mobile stations, programmable logic controllers (PLCs), or any other or additional devices.

The gateway infrastructure node 212 communicates wirelessly with, transmits data to, and receives data from one or more infrastructure nodes 208a-208e and possibly one or more leaf nodes 210a-210e. The gateway infrastructure node 212 also converts data between the protocol(s) used by the network 206 and the protocol(s) used by the nodes 208a-208e and 210a-210e. For example, the gateway infrastructure node 212 could convert Ethernet-formatted data (transported over the network 206) into a wireless protocol format (such as an IEEE 802.11a, 802.11b, 802.11g, 802.11n, 802.15.3, 802.15.4, or 802.16 protocol format) used by the nodes 208a-208e and 210a-210e. The gateway infrastructure node 212 could also convert data received from one or more of the nodes 208a-208e and 210a-210e into Ethernet-formatted data for transmission over the network 206. In addition, the gateway infrastructure node 212 could support various functions, such as network creation and security, used to create and maintain a wireless network. The gateway infrastructure node 212 includes any suitable structure for facilitating communication between components or networks using different protocols.

In particular embodiments, the leaf nodes 210a-210e can include 802.15.4-based low data-rate sensors and 802.11-based high data-rate devices, and the various nodes in FIG. 2 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

In this example, a wireless configuration and OLE for Process Control (OPC) server 214 can be used to configure and control various aspects of the process control system 200. For example, the server 214 could be used to configure the operation of the infrastructure nodes 208a-208e and the gateway node 212. The server 214 could also be used to support security in the process control system 200. For instance, the server 214 could distribute cryptographic keys or other security data to various components in the process control system 200, such as to the nodes 208a-208e, 210a-210e, and 212. The server 214 includes any hardware, software, firmware, or combination thereof for configuring wireless networks and providing security information.

In one aspect of operation, the nodes 208a-208e, 210a-210e, and 212 can communicate using wireless channels, such as frequency-time slots. The frequencies or frequency bands used by the nodes 208a-208e, 210a-210e, and 212 can include one or more licensed frequencies or frequency bands that are also used by at least one primary user 216. The primary users 216 represent devices or systems licensed to communicate using the one or more licensed frequencies or frequency bands. The primary users 216 are therefore entitled to use the one or more licensed frequencies or frequency bands and have priority over the nodes 208a-208e, 210a-210e, and 212.

As described in more detail below, various ones of the nodes 208a-208e, 210a-210e, and 212 can identify white spaces that are not in active use by any primary users 216. Those nodes can then select and use channels (such as frequency-time slots) in the identified white spaces. In addition, a function (such as a hash function) can be used to identify which nodes can use the channels in the white spaces to avoid contention. This can be done in a way that reduces the need for control signals to be exchanged between the nodes.

Although FIG. 2 illustrates one example of a process control system 200, various changes may be made to FIG. 2. For example, the process control system 200 could include any number of process elements, controllers, networks (wired or wireless), infrastructure nodes (gateway or other), leaf nodes, and servers. Also, the functional division shown in FIG. 2 is for illustration only. Various components in FIG. 2 could be combined, subdivided, or omitted and additional components could be added according to particular needs. In addition, FIG. 2 illustrates one example operational environment where the selection of channels in white spaces can be performed. This functionality could be used with any suitable device and in any suitable system (whether or not related to or used for process control).

Figure 3:
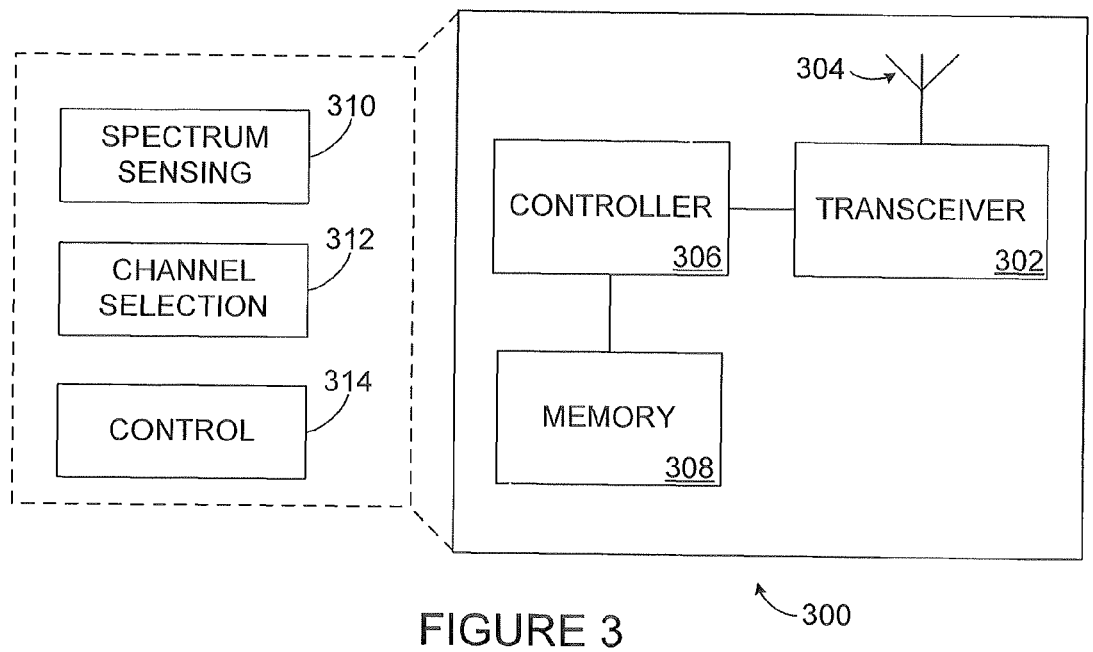
FIG. 3 illustrates an example wireless node in a wireless communication network in accordance with this disclosure.

FIG. 3 illustrates an example wireless node 300 in a wireless communication network in accordance with this disclosure. The wireless node 300 could, for example, represent various ones of the wireless nodes in FIG. 1 or FIG. 2. The embodiment of the wireless node 300 shown in FIG. 3 is for illustration only. Other embodiments of the wireless node 300 could be used without departing from the scope of this disclosure.

As shown in FIG. 3, the node 300 includes a transceiver 302. The transceiver 302 facilitates wireless communications to and from the node 300 using wireless signals. For example, the transceiver 302 could receive a baseband or intermediate data signal and modulate the signal onto a carrier signal for transmission by an antenna 304. The transceiver 302 could also receive a carrier signal from the antenna 304 and downconvert the signal into a baseband or intermediate signal. The transceiver 302 includes any suitable structure for transmitting and/or receiving wireless signals. In some embodiments, the transceiver 302 represents an RF transceiver, and the antenna 304 represents an RF antenna. The transceiver 302 could use any other suitable wireless signals to communicate. Also, the transceiver 302 could represent a transmitter and a separate receiver.

A controller 306 is coupled to the transceiver 302. The controller 306 controls the overall operation of the node 300. For example, the controller 306 may receive or generate data to be transmitted externally, and the controller 306 could provide the data to the transceiver 302 for wireless transmission. The controller 306 could also receive data from the transceiver 302 that was transmitted to the node 300 and use the data. As a particular example, the controller 306 could receive or generate measurement data associated with an industrial process and provide the data to the transceiver 302 for transmission to a process controller. The controller 306 could also receive data from the process controller and adjust operation of one or more actuators in a process control system. The controller 306 includes any suitable structure(s) for controlling operation of the node 300. As particular examples, the controller 306 could represent a processor, microprocessor, microcontroller, field programmable gate array (FPGA), or other processing or control device.

A memory 308 is coupled to the controller 306. The memory 308 stores any of a wide variety of information used, collected, or generated by the node 300. For example, the memory 308 could store various information used by the node 300 to identify channels in white spaces and to determine which node has priority to use a channel (such as hash functions, node identifiers, and frequency-time slot information). The memory 308 includes any suitable volatile and/or nonvolatile storage and retrieval device or devices.

In this example, the memory 308 can store and the controller 306 can execute instructions for identifying and selecting channels from white spaces (which could include licensed frequencies or frequency bands). As shown in FIG. 3, the node 300 executes, supports, or otherwise includes a spectrum sensing unit 310, a channel selection unit 312, and a control unit 314. The spectrum sensing unit 310 scans various frequencies or frequency bands to determine if any other devices (such as primary users) are using the frequencies or frequency bands. The channel selection unit 312 uses information from the spectrum sensing unit 310 (and possibly from other wireless nodes) to select one or more channels in the white spaces for use. The control unit 314 uses information from the channel selection unit 312 to communicate with other wireless nodes using the selected channels.

In some embodiments, the identification and selection of wireless channels in white spaces could occur as follows. The spectrum sensing unit 310 in the wireless node 300 scans licensed frequencies or frequency bands and identifies white spaces, which are unused portions of the licensed spectrum. The identified white spaces can be shared with other wireless nodes, such as other nodes within the interference region of that wireless node 300. In particular embodiments, a "two-hop" neighborhood could be used when sharing white space information, where the node 300 shares its identified white spaces with any nodes within two hops of the node 300. In this way, each wireless node can build a map of the white spaces that are available to all nodes in that node's interference region. A separate control channel can be reserved in the wireless network for the wireless nodes to announce their identified white spaces and to identify occupied channels, where all nodes can tune to this control channel when not transmitting or receiving.

The spectrums in the identified white spaces are divided into channels, such as frequency slots and time slots. When a wireless node 300 needs to transmit data, its selection unit 312 can select a channel in the identified white spaces, such as by reserving a frequency-time slot for itself and the intended receiver(s). The control unit 314 can then initiate communications using the identified channel if the wireless node 300 has priority to use that identified channel.

To determine which wireless node can use a channel in a white space, the channel selection unit 312 can implement a scheme that uses a reduced or minimum number of handshaking or other control signals for the channel reservation process. This allows the channel selection unit 312 to reduce overhead and other problems experienced by conventional systems. For example, the channel selection units 312 could implement functions to identify a channel access factor for each wireless node. A channel access factor is a value that represents a priority of a wireless node to use a particular channel. The channel access factors can be computed for multiple nodes at each of those nodes. The node with the highest channel access factor could "win" the particular channel, which allows the node to communicate using that particular channel. In this way, the nodes can easily identify which channels can be used by those nodes, with little or no control signals required between the nodes.

As a particular example, channel selection units 312 in multiple wireless nodes can use pseudo-random hash functions to achieve weighted allocations without explicit control signal exchanges. For instance, each wireless node can be identified by or associated with a unique identifier $id_i$. A hash function can be distributed to each wireless node, such as before that wireless node is deployed in a wireless network. For each time slot t and for each frequency slot f, the channel selection unit 312 in a wireless node can compute the hash value $H_{i,f,t}$ for itself and for each node in its interference region. The hash value $H_{i,f,t}$ for node i can be expressed as:

$$H_{i,f,t} = R(id_i, f, t). \quad (1)$$

Here, R represents a function performed using the node identifier $id_i$, a frequency slot f, and a time slot t. A node $id_i$ "wins" or is allowed to communicate using a particular frequency-time slot (f, t) if its hash value $H_{i,f,t}$ is the largest hash value for all nodes. This can be expressed as:

$$i_{f,t} = \arg \max_i H_{i,f,t}. \quad (2)$$

If the function R is a uniformly distributed pseudo-random number generator, the above allocation can guarantee equal opportunities for all nodes on all frequency slots.

This scheme can be easily extended to support weighted allocations, such as to favor wireless nodes with higher data rates, a higher class of service, an assigned priority, or more important data. In this weighted scheme, the hash function H could be defined as follows:

$$H_{i,f,t} = R(id_i, f, t)^{1/w_i}. \quad (3)$$

Here, R can be a uniformly distributed pseudo-random number generator. Also, the probability of a node i winning a frequency-time slot is proportional to its weight $w_i$, and this can be expressed as:

$$P[i_{f,t} = \arg \max_i H_{i,f,t}] = \frac{w_i}{\sum_k w_k}. \quad (4)$$

This contention process can involve computations in wireless nodes without any control signal exchanges between those wireless nodes. The winner of a frequency-time slot (f, t) can subsequently advertise its frequency-time slot over the dedicated control channel. This allows any receivers to tune to the right channel at the right time, and it allows other nodes to remain silent during that particular slot.

Among other things, this provides a contention process that can significantly reduce the number of control signals and communication overhead, while also improving robustness, spectral utilization, and network throughput. This can be done by reducing or eliminating any dependencies on reliable control signal exchanges. In addition, this process can eliminate the need for a network-wide central controller that is responsible for white space construction and allocation. This can improve the scalability of the system while still enabling spectrum spatial reuse.

The spectrum sensing unit 310 includes any hardware, software, firmware, or combination thereof for scanning frequencies or frequency bands to determine if the frequencies or frequency bands are being used. The channel selection unit 312 includes any hardware, software, firmware, or combination thereof for selecting one or more channels for use. The control unit 314 includes any hardware, software, firmware, or combination thereof for controlling the selection and use of channels by the wireless node 300. As a particular example, these components 310-314 could be implemented as a Layer-2 service in software defined radio platforms for cognitive radio networks.

Although FIG. 3 illustrates one example of a wireless node 300 in a wireless communication network, various changes may be made to FIG. 3. For example, various components in FIG. 3 could be combined, subdivided, or omitted and additional components could be added according to particular needs. Also, while the components 310-314 have been described as residing in the memory 308 and being executed by the controller 306, the components 310-314 could be implemented in any other suitable manner (such as using physical circuits).

Figure 4:
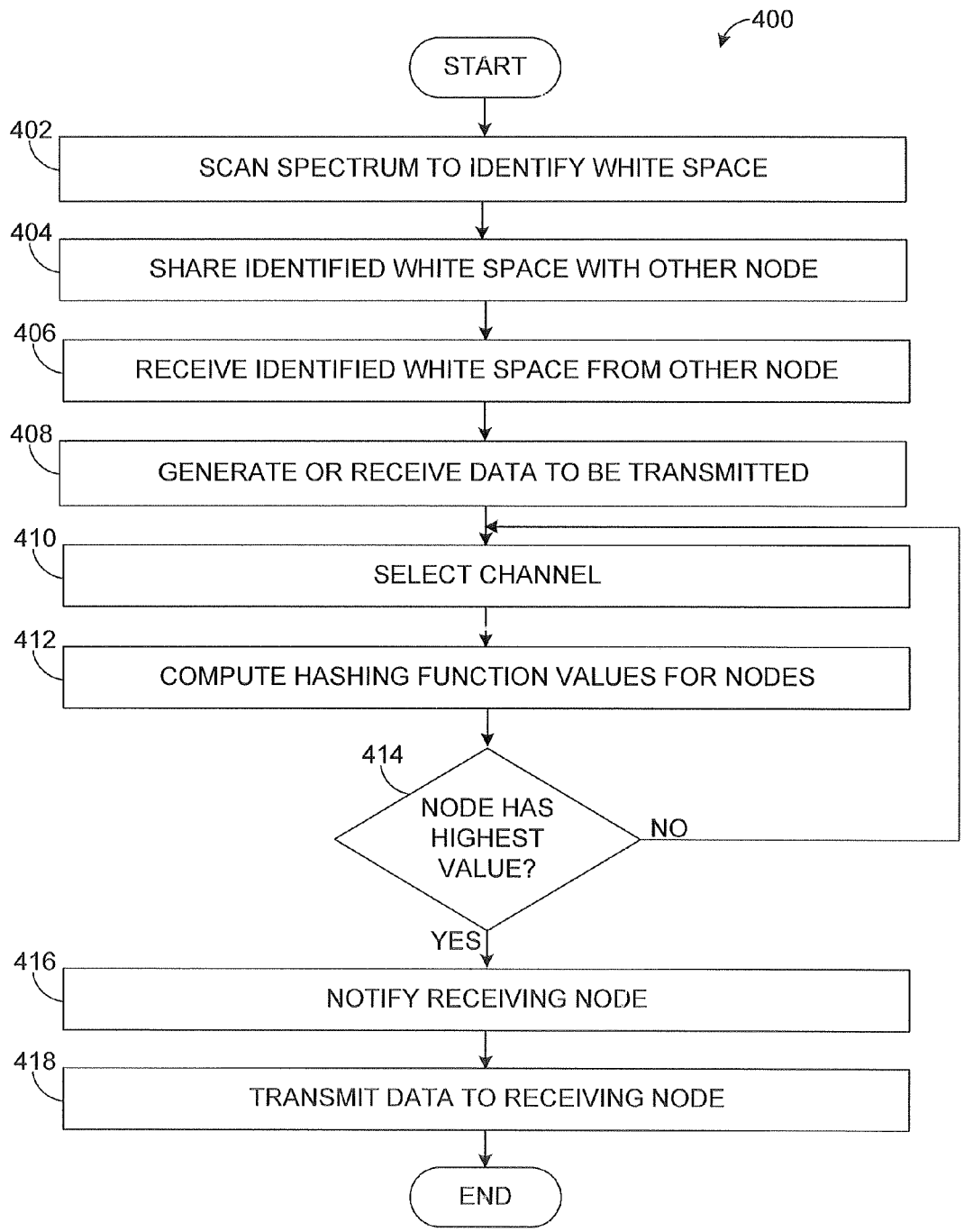
FIG. 4 illustrates an example method for medium access control in a wireless communication network in accordance with this disclosure.

FIG. 4 illustrates an example method 400 for medium access control in a wireless communication network in accordance with this disclosure. The embodiment of the method 400 shown in FIG. 4 is for illustration only. Other embodiments of the method 400 could be used without departing from the scope of this disclosure.

One or more spectrums are scanned to identify one or more white spaces at step 402. This could include, for example, the spectrum sensing unit 310 in a wireless node 300 scanning one or more licensed spectrums to identify frequencies or frequency bands that are not currently in use.

The one or more identified white spaces are shared with one or more other nodes at step 404. This could include, for example, the control unit 314 providing information defining the one or more identified white spaces to the transceiver 302 for transmission. The information could be transmitted from that wireless node 300 to any one-hop and two-hop neighbors of that node 300. The one-hop neighbors represent any wireless nodes directly communicating with the node 300. The two-hop neighbors represent any wireless nodes directly communicating with the one-hop neighbors.

One or more white spaces identified by other nodes are received at step 406. This could include, for example, the control unit 314 receiving from the transceiver 302 information defining white spaces that have been identified by its one-hop and two-hop neighbors.

Data to be transmitted is generated or received at step 408. This could include, for example, the wireless node 300 generating data to be transmitted to at least one other wireless node. This could also include the wireless node 300 receiving the data from an external source.

The wireless node selects a channel at step 410. This could include, for example, the channel selection unit 312 selecting a frequency-time slot (f, t). The wireless node computes a hash function value for itself and one or more neighboring nodes at step 412. This could include, for example, the channel selection unit 312 computing a hash function value $H_{i,f,t}$ using its own identifier and the frequency-time slot (f, t). This could also include the channel selection unit 312 computing a hash function value $H_{i,f,t}$ using the identifier of each one-hop or two-hop neighbor and the frequency-time slot (f, t).

The wireless node decides if its hash function value is the highest value at step 414. This could include, for example, the channel selection unit 312 comparing its own hash function value $H_{i,f,t}$ against the hash function values $H_{i,f,t}$ for its neighboring nodes. In the event of a tie between two or more nodes having equal hash function values, a tie-breaker could be used, such as selecting the wireless node with highest identifier value.

If the wireless node does not have the highest hash function value, the process returns to step 410, where the wireless node can select another channel and recompute the hash function values. Eventually, the wireless node 300 finds a channel where the node has the highest hash function value.

When the wireless node has the highest hash function value, one or more receiving nodes are notified that the wireless node will transmit data on the selected channel at step 416. This could include, for example, the control unit 314 in the node 300 initiating a broadcast of a message on a control channel, where the message indicates that the selected frequency-time slot (f, t) belongs to that node 300. This allows any receiving node(s) to tune to the frequency-time slot (f, t). The data is then transmitted to the one or more receiving nodes at step 418. This could include, for example, the control unit 314 initiating a broadcast of the data using the selected frequency-time slot (f, t).

Although FIG. 4 illustrates one example of a method 400 for medium access control in a wireless communication network, various changes may be made to FIG. 4. For example, while shown as a series of steps, various steps in FIG. 4 could overlap, occur in parallel, occur multiple times, or occur in a different order. Also, while shown as using hash function values, any other suitable channel access factors could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
    identifying a white space at a first wireless node, the white space comprising at least one frequency or frequency band not in use;
    selecting a channel in the identified white space;
    identifying at the first wireless node a channel access factor for each of multiple wireless nodes including the first wireless node;
    determining if the first wireless node has a specified channel access factor; and
    transmitting data from the first wireless node on the channel when the first wireless node has the specified channel access factor.

2. The method of claim 1, wherein identifying the channel access factor for each of the multiple wireless nodes and determining if the first wireless node has the specified channel access factor are performed without using control signals transmitted between the wireless nodes.

3. The method of claim 1, wherein:
    the channel comprises a frequency slot and a time slot; and
    the channel access factor comprises a hash function value determined using a hash function, the hash function based on at least one of: a wireless node identifier, the frequency slot, and the time slot.

4. The method of claim 3, wherein the hash function is also based on a wireless node weight.

5. The method of claim 4, wherein the hash function is expressed as:

$$H_{i,f,t} = R(id_i, f, t)^{1/w_i}$$

where $H_{i,f,t}$ represents the hash function value, R represents a uniformly distributed pseudo-random number generator, $id_i$ represents the wireless node identifier of node i, f represents the frequency slot, t represents the time slot, and $w_i$ represents the weight of node i.

6. The method of claim 3, wherein the specified channel access factor comprises a highest hash function value.

7. The method of claim 1, further comprising:
    notifying one or more receiving wireless nodes that the first wireless node will transmit the data on the channel.

8. The method of claim 1, further comprising:
    transmitting information associated with the identified white space to at least one other wireless node; and
    receiving information associated with at least one additional identified white space from the at least one other wireless node.

9. The method of claim 8, wherein the information associated with the identified white space is transmitted to one-hop and two-hop neighbors of the first wireless node, each one-hop neighbor comprising a wireless node directly communicating with the first wireless node, each two-hop neighbor comprising a wireless node directly communicating with a one-hop neighbor.

10. The method of claim 1, wherein the at least one frequency or frequency band not in use comprises at least one licensed frequency or frequency band.

11. An apparatus comprising:
    a spectrum sensing unit configured to identify a white space, the white space comprising at least one frequency or frequency band not in use;
    a channel selection unit configured to identify a channel access factor for each of multiple wireless nodes, the wireless nodes including the apparatus, the channel selection unit also configured to determine if the apparatus has a specified channel access factor; and
    a control unit configured to control transmission of data from the apparatus on a channel in the identified white space depending on whether the apparatus has the specified channel access factor.

12. The apparatus of claim 11, wherein the channel selection unit is configured to identify the channel access factor for each of the multiple wireless nodes and to determine if the apparatus has the specified channel access factor without using control signals transmitted between the wireless nodes.

13. The apparatus of claim 11, wherein:
the channel comprises a frequency slot and a time slot; and
the channel access factor comprises a hash function value determined using a hash function, the hash function based on at least one of: a wireless node identifier, the frequency slot, the time slot, and a wireless node weight.

14. The apparatus of claim 13, wherein the specified channel access factor comprises a highest hash function value.

15. The apparatus of claim 11, further comprising:
a transceiver configured to transmit the data on the channel.

16. The apparatus of claim 11, wherein the spectrum sensing unit, the channel selection unit, and the control unit comprise software instructions stored in a memory and executed by a controller in the apparatus.

17. A non-transitory computer readable storage medium embodying a computer program, the computer program comprising:
computer readable program code for identifying a white space at a first wireless node, the white space comprising at least one frequency or frequency band not in use;
computer readable program code for selecting a channel in the identified white space;
computer readable program code for identifying at the first wireless node a channel access factor for each of multiple wireless nodes including the first wireless node;
computer readable program code for determining if the first wireless node has a specified channel access factor; and
computer readable program code for initiating transmission of data from the first wireless node on the channel when the first wireless node has the specified channel access factor.

18. The computer readable storage medium of claim 17, wherein the computer readable program code for identifying the channel access factor for each of the multiple wireless nodes and the computer readable program code for determining if the first wireless node has the specified channel access factor are not based on control signals transmitted between the wireless nodes.

19. The computer readable storage medium of claim 17, wherein:
the channel comprises a frequency slot and a time slot; and
the channel access factor comprises a hash function value determined using a hash function, the hash function based on at least one of: a wireless node identifier, the frequency slot, the time slot, and a wireless node weight.

20. The computer readable storage medium of claim 19, wherein the specified channel access factor comprises a highest hash function value.

* * * * *